(12) United States Patent
Lee

(10) Patent No.: US 8,417,863 B2
(45) Date of Patent: Apr. 9, 2013

(54) SYNCHRONOUS BUS DRIVING WITH REPEATERS

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 12/838,231

(22) Filed: Jul. 16, 2010

(65) Prior Publication Data

US 2012/0017107 A1    Jan. 19, 2012

(51) Int. Cl.
*G06F 13/00* (2006.01)
*G06F 13/16* (2006.01)
*G06F 13/20* (2006.01)
*G06F 13/36* (2006.01)
*G06F 13/38* (2006.01)
*G06F 13/40* (2006.01)

(52) U.S. Cl. ......... 710/300; 710/104; 710/108; 710/316

(58) Field of Classification Search .................... 710/305
See application file for complete search history.

(56) References Cited

U.S. PATENT DOCUMENTS

| 5,296,759 A | 3/1994 | Sutherland et al. |
| 6,295,277 B1 | 9/2001 | Fahey |
| 7,065,054 B1 | 6/2006 | Voloshin |
| 2008/0120458 A1 | 5/2008 | Gillingham et al. |

*Primary Examiner* — Ryan Stiglic
(74) *Attorney, Agent, or Firm* — Fletcher Yoder PC

(57) ABSTRACT

Present techniques involve systems and methods for driving a synchronous bus by implementing repeaters along the bus to restore and/or amplify a signal transmitted through the bus. In one embodiment, a repeater may be implemented at different sections of a synchronous bus, and each repeater may be activated according to where a signal is to be transmitted. In another embodiment, decoders may be configured to each repeater on the synchronous bus. As a signal directed to a section of a bus is transmitted through the bus, each sequential decoder may identify the bus section to which a signal is directed. The decoder may enable its corresponding repeater based on the bus section to which the signal is directed, such that all repeaters along the bus which come before the signal destination may be enabled to allow signal transmission through the bus and signal restoration by the repeaters.

24 Claims, 7 Drawing Sheets

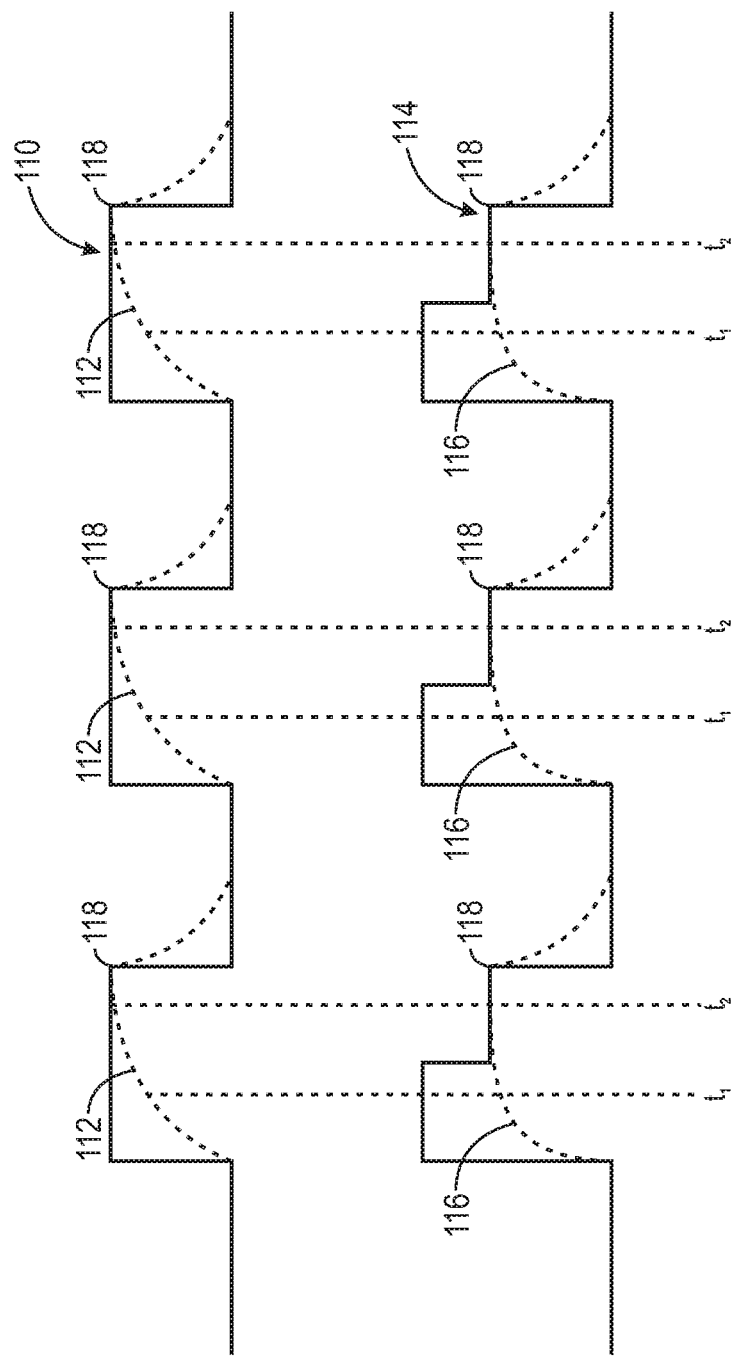

SYNCHRONOUS BUS DRIVING WITH REPEATERS

BACKGROUND

The present disclosure relates generally to electronic devices, and more particularly, to synchronous bus driving techniques of such devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic systems or components may typically implement a synchronous bus to interconnect multiple devices according to a clock signal. As technology advances, electronic systems may interconnect an increasing number of electronic devices via the synchronous bus. For example, a liquid crystal display (LCD) is commonly used as a screen or a display for a wide variety of electronic devices. Such LCD devices typically include thousands (or millions) of picture elements, i.e., pixels, arranged in a matrix of rows (also referred to as "scanning lines" and columns (also referred to as "data lines"). For any given pixel, the amount of light viewable on the LCD depends on the voltage driven to the pixel. The pixels may be driven by scanning line and data line circuitry which converts digital image data into analog voltage values which may be supplied to pixels. The driving circuitry may drive the pixels using clock signals and data signals received from a display controller via a synchronous bus.

To meet demands for larger display areas, LCD devices may include a large matrix of pixels. To synchronously drive such a large pixel matrix, data signals and clock signals may be transmitted via a relatively long synchronous bus to interconnect all the data lines of the pixel matrix. Due to resistive-capacitive (RC) characteristics and/or electromagnetic interferences of the bus, signals may increasingly degrade as they are transmitted through the length of the bus. For example, a clock signal may generally be a square wave having steep edges, and data may be latched according to the rising and/or falling edges if the clock signal. However, a clock signal that is transmitted through a long bus may become degraded due to the RC effects, and may have a sloped, rather than a square waveform. The sloped waveform of a degraded clock signal may cause data to be latched later, or not at all.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to techniques for transmitting signals over a synchronous bus in an electronic system. One embodiment includes implementing repeaters along a synchronous bus and enabling the repeaters to restore and/or amplify a signal (e.g., clock and/or data signals) transmitted through the bus. In one embodiment, a synchronous bus may be sectioned (e.g., into 8 sections), and a repeater may be implemented at the beginning of each section. The repeaters on different sections of the bus may be activated according to where a signal is to be transmitted. For example, a repeater of a destined bus section may be enabled (e.g., by a controller), and preceding repeaters on the bus may be enabled to restore the signal as it is transmitted to the destined bus section. The enabled repeaters may restore the shape of a signal and/or amplify a signal, thereby reducing the effects of signal degradation due to the resistive-capacitive (RC) characteristics and/or electromagnetic interference of the synchronous bus. Restoring signals transmitted over a synchronous bus may decrease data latching delays and/or data failures which may occur when signals are transmitted over a relatively long bus.

In another embodiment, decoders may be configured to each repeater on the synchronous bus, such that a signal may be transmitted over a bus and restored by repeaters preceding a destined location on the bus without additional wiring between the controller and preceding repeater(s). For example, as a signal is transmitted through the bus and directed to some section of the bus, each sequential decoder along the bus may use the most significant bits of the signal's destination address of to identify the section of the bus to which a signal is directed. If the most significant bits are addressed to a higher bus section (e.g., a bus section beyond the section on which the decoder is configured) or to the bus section on which the decoder is configured, the decoder may enable its corresponding repeater, such that all repeaters of the synchronous bus which precede the signal destination may be enabled to allow signal transmission through the bus and signal restoration by the repeaters. Subsequent repeaters may remain disabled, which may reduce power consumption in the system.

BRIEF DESCRIPTION OF THE DRAWINGS

Various aspects of this disclosure may be better understood upon reading the following detailed description and upon reference to the drawings in which:

FIG. 8 is a diagram depicting examples of pre-emphasized signals which may be used with repeaters in driving signals through a synchronous bus, in accordance with aspects of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, it should be understood that references to "one embodiment," "an embodiment," "some embodiments," and the like are not intended to be interpreted as excluding the existence of additional embodiments that also incorporate the disclosed features.

As will be discussed below, the present disclosure is generally directed to electronic devices and components which transmit signals through a synchronous bus. More specifically, the present techniques involve methods of restoring signals transmitted through a synchronous bus by enabling repeaters along the bus based on the destination of the transmitted signals. While some examples given in this disclosure may apply to electronic display devices in particular, the present disclosure is not limited to display devices. Techniques for restoring signals transmitted through a synchronous bus may apply to any electronic system or component which includes a synchronous bus for transmitting data and/or clock signals.

Figure 1:
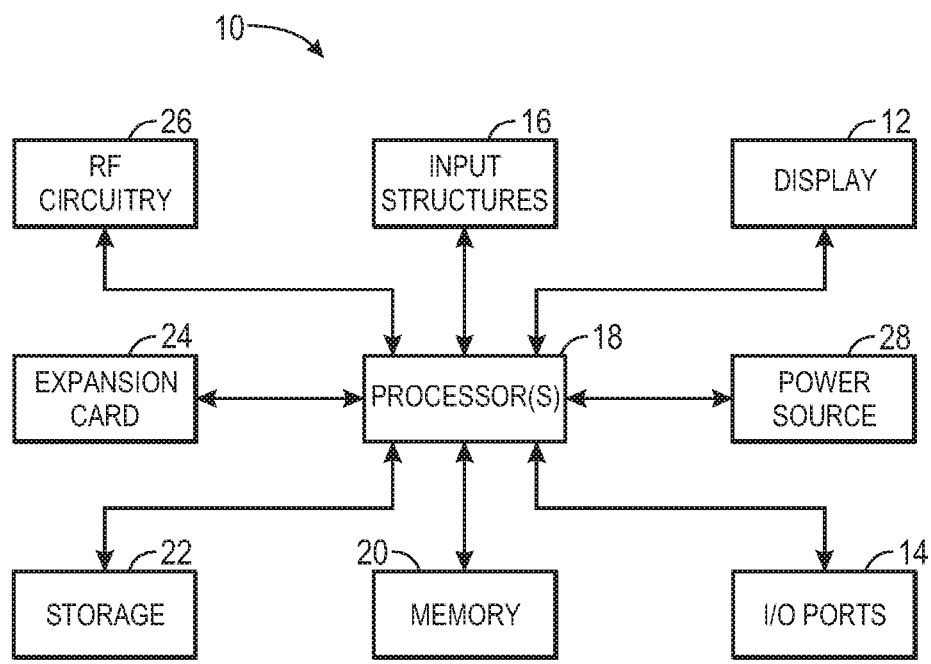
FIG. 1 is a block diagram depicting exemplary components of an electronic device, in accordance with aspects of the present disclosure.
Figure 2:
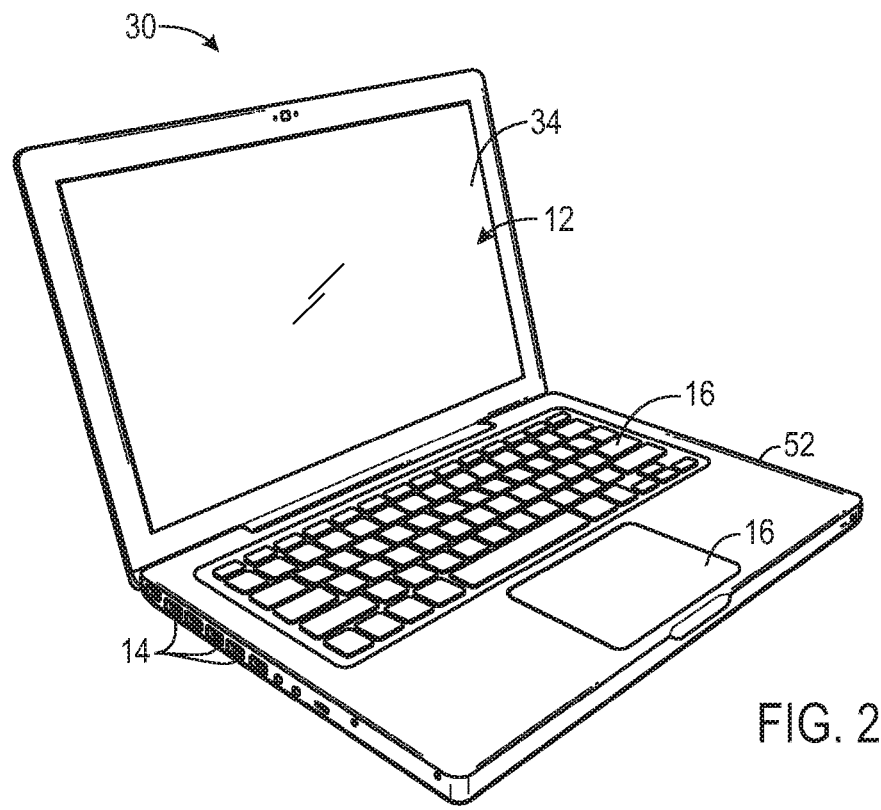
FIG. 2 is a view of a computer, in accordance with aspects of the present disclosure.
Figure 3:
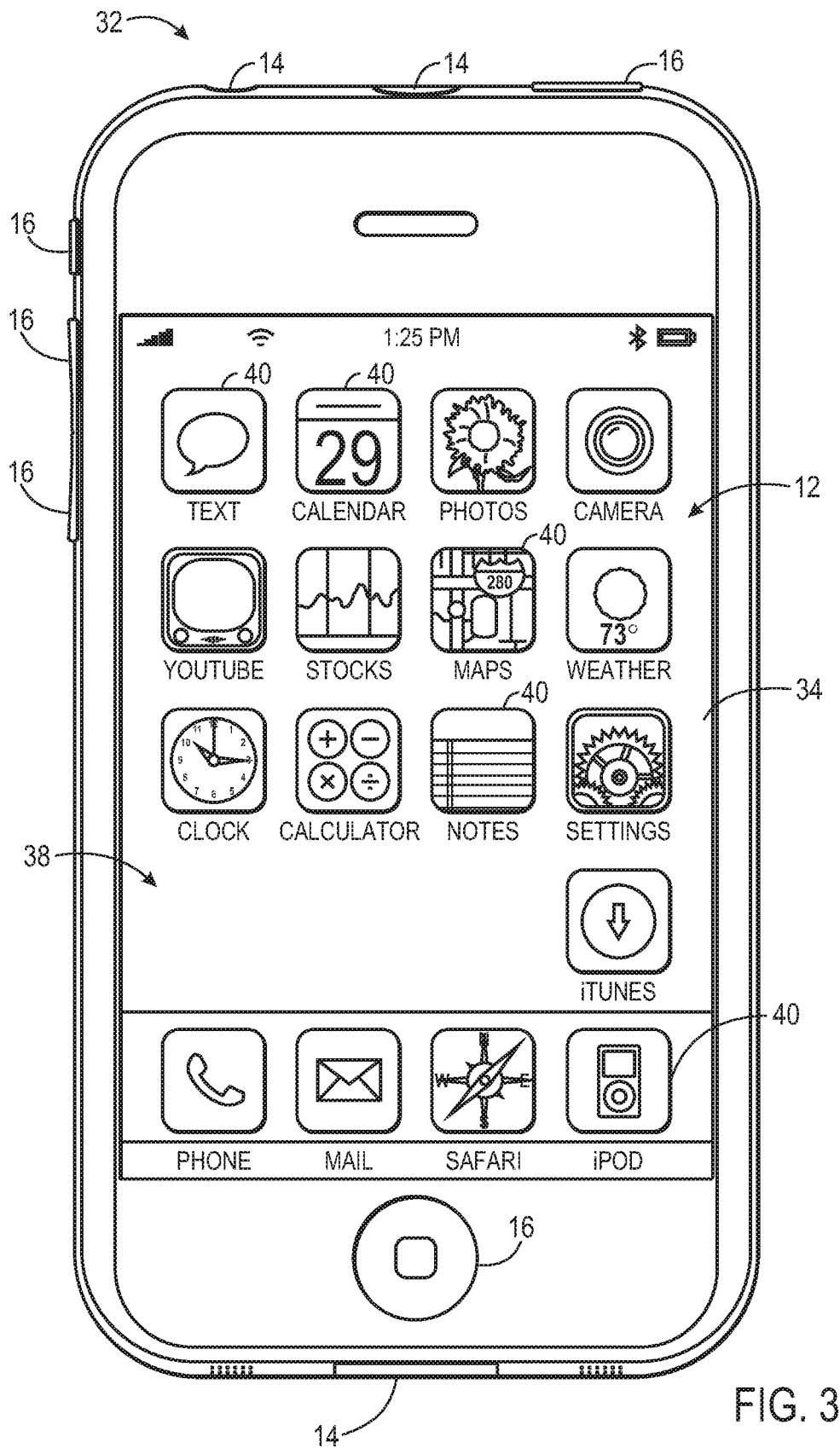
FIG. 3 is a front view of a handheld electronic device, in accordance with aspects of the present disclosure.

With these foregoing features in mind, examples for suitable electronic systems that may implement a synchronous bus with repeaters in accordance with aspects of the present disclosure are provided below. In FIG. 1, a block diagram depicting various components that may be present in electronic devices suitable for use with the present techniques is provided. In FIG. 2, one example of a suitable electronic device, provided here as a handheld electronic device, is depicted. In FIG. 3, another example of a suitable electronic device, provided here as a computer system, is depicted. These types of electronic devices, and other electronic devices using synchronous buses, may be used in conjunction with the present techniques.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 14, input structures 16, one or more processors 18, a memory device 20, a non-volatile storage 22, expansion card(s) 24, a networking device 26, and a power source 28.

The display 12 may be used to display various images generated by the electronic device 10. In one embodiment, the display 12 may be a liquid crystal display (LCD). For example, the display 12 may be an LCD employing fringe field switching (FFS), in-plane switching (IPS), or other techniques useful in operating such LCD devices. Additionally, in certain embodiments of the electronic device 10, the display 12 may be provided in conjunction with a touch-sensitive element, such as a touchscreen, that may be used as part of the control interface for the device 10. The display 12 may include a matrix of pixels and circuitry for modulating the transmittance of light through each pixel to display an image. Further, image signals may be transmitted over a synchronous bus such that data may be latched and directed to each pixel. In some embodiments, repeaters may be utilized throughout the length of the synchronous bus and may be selectively enabled to restore a signal transmitted to destined location on the bus.

FIG. 2 illustrates an embodiment of the electronic device 10 in the form of a computer 30. The computer 30 may include computers that are generally portable (such as laptop, notebook, tablet, and handheld computers), as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® Mini, or Mac Pro®, available from Apple Inc. of Cupertino, Calif. The depicted computer 30 includes a housing or enclosure 33, the display 12, I/O ports 14, and input structures 16.

The display 12 may be integrated with the computer 30 (e.g., such as the display of a laptop computer) or may be a standalone display that interfaces with the computer 30 using one of the I/O ports 14, such as via a DisplayPort, DVI, High-Definition Multimedia Interface (HDMI), or analog (D-sub) interface. For instance, in certain embodiments, such a standalone display 12 may be a model of an Apple Cinema Display®, available from Apple Inc.

The electronic device 10 may also take the form of other types of devices, such as mobile telephones, media players, personal data organizers, handheld game platforms, cameras, and/or combinations of such devices. For instance, as generally depicted in FIG. 3, the device 10 may be provided in the form of a handheld electronic device 32 that includes various functionalities (such as the ability to take pictures, make telephone calls, access the Internet, communicate via email, record audio and/or video, listen to music, play games, connect to wireless networks, and so forth). By way of example, the handheld device 32 may be a model of an iPod®, iPod® Touch, or iPhone® available from Apple Inc.

In the depicted embodiment, the handheld device 32 includes the display 12, which may be in the form of an LCD 34. The LCD 34 may display various images generated by the handheld device 32, such as a graphical user interface (GUI) 38 having one or more icons 40.

In another embodiment, the electronic device 10 may also be provided in the form of a portable multi-function tablet computing device (not illustrated). In certain embodiments, the tablet computing device may provide the functionality of two or more of a media player, a web browser, a cellular phone, a gaming platform, a personal data organizer, and so forth. By way of example only, the tablet computing device may be a model of an iPad® tablet computer, available from Apple Inc.

With the foregoing discussion in mind, it may be appreciated that an electronic device 10 in either the form of a handheld device 30 (FIG. 2) or a computer 50 (FIG. 3) may be provided with a display device 10 in the form of an LCD 34. As discussed above, an LCD 34 may be utilized for displayed respective operating system and/or application graphical user interfaces running on the electronic device 10 and/or for displaying various data files, including textual, image, video data, or any other type of visual output data that may be associated with the operation of the electronic device 10.

Figure 4:
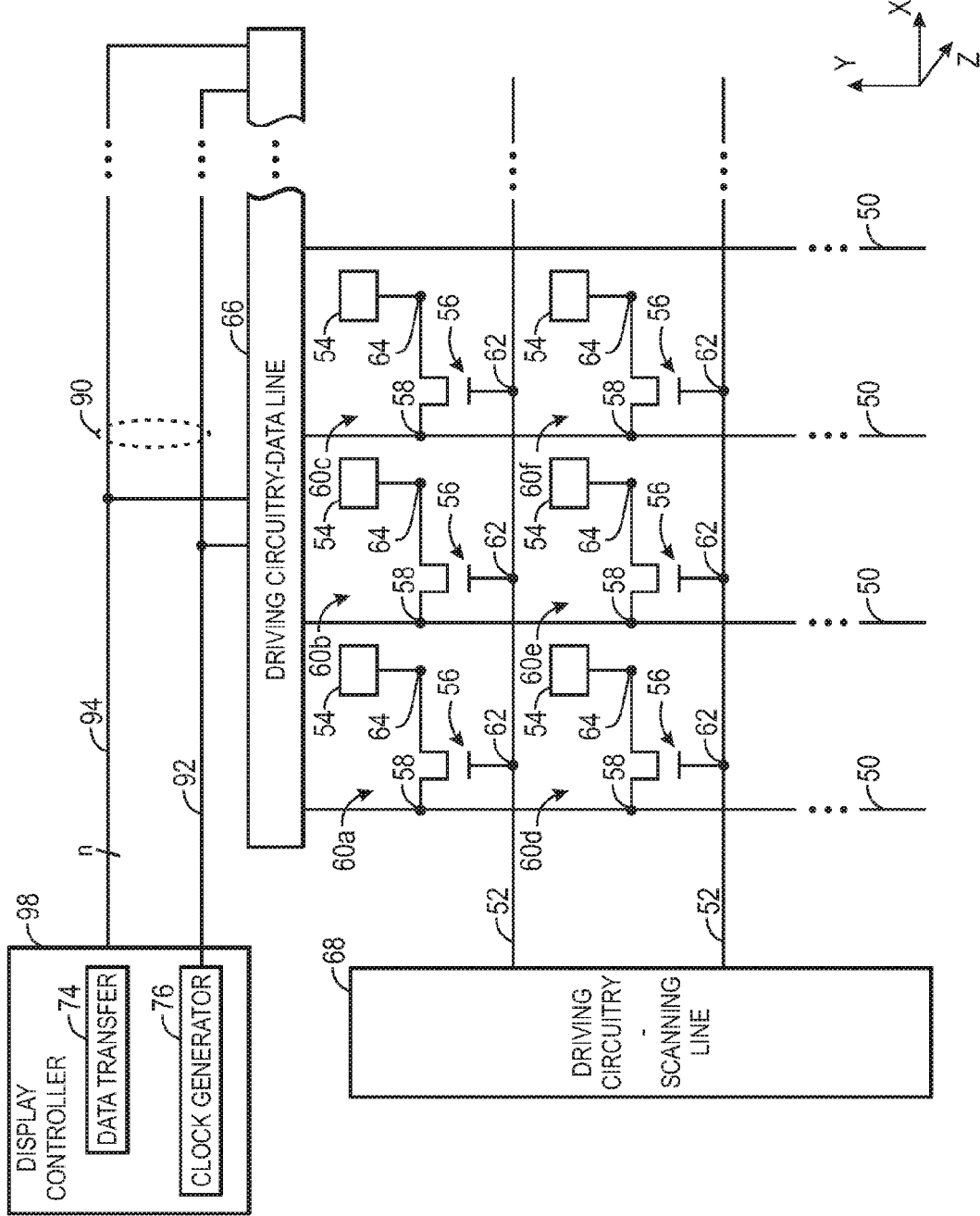
FIG. 4 is a schematic diagram showing a synchronous bus connecting driving circuitry that may be used in conjunction with an electronic display device, in accordance with aspects of the present disclosure.

Further, pixel elements of a display 12 or an LCD 34 may be driven by circuitry which converts digital image data into analog voltage values and supplies the voltage to activate the pixels. The image data may be transmitted to the driving circuitry via a synchronous bus extending from the display controller through the length of the pixel matrix of the LCD 34. For example, FIG. 4 is a schematic circuit representation of pixel driving circuitry that may be found in an LCD 34. As depicted, a plurality of unit pixels 60, each of which may be formed in accordance with the unit pixel 60 shown in FIG. 4, may be disposed in a pixel array or matrix defining a plurality of rows and columns of unit pixels that collectively form an image display region of an LCD 34. In such an array, each unit pixel 60 may be defined by the intersection of rows and columns, which may be defined by the illustrated data (or "source") lines 50 and scanning (or "gate") lines 52, respectively.

Each unit pixel 60 includes a pixel electrode 54 and thin film transistor (TFT) 56 for switching the pixel electrode 54. In the depicted embodiment, the source 58 of each TFT 56 is electrically connected to a data line 50, extending from respective data line driving circuitry 66. Similarly, in the depicted embodiment, the gate 62 of each TFT 56 is electrically connected to a scanning or gate line 52, extending from respective scanning line driving circuitry 68. In one embodiment, the data line driving circuitry 66 may send image signals to the pixels 60 by way of the respective data lines 50, and the scanning lines 52 may apply scanning signals from the scanning line driving circuitry 68 to the respective gates 62 of each TFT 56 to which the respective scanning lines 52 are connected. Such image and/or scanning signals may be applied by line-sequence, and the data lines 50 and/or gate lines 52 may be synchronously activated during operation of the LCD 34. When activated, the TFT 56 may store the image signals received via a respective data line 50 as a charge in the pixel electrode 54.

The synchronous activation of data lines 50 and/or gate lines 52 of the pixels 60 may involve transmission of signals over a synchronous bus 90 to the driving circuitry 66 and/or 68. For example, data signals and clock signals may be provided to the data line driving circuitry 66 by the display controller 98 via the synchronous bus 90. The display controller 98 may include a data transmitter 74 and a clock generator 76 for generating the data signals and clock signals, respectively. As illustrated, the synchronous bus 90 may be shared by n number of data lines 94 (e.g., 48 data lines) and clock lines 92.

The number n of data lines 94 and/or clock lines 92 shared by the synchronous bus 90 may depend on the size of the pixel matrix in the LCD 34. Although only six unit pixels, referred to individually by the reference numbers 60a-60f, respectively, are shown in the present example for purposes of simplicity, it should be understood that in an actual LCD implementation, the synchronous bus 90 may transmit signals to driving circuitry 66 and/or 68 which latches data for hundreds of data lines 50 and/or scanning lines 52. By way of example, in a color LCD panel 34 having a display resolution of 960×640, each of the 960 data lines 50, which may define a column of the pixel array, may include 640 unit pixels, while each of the 640 scanning lines 52, which may define a row of the pixel array, may include 960 groups of pixels.

The synchronous bus 90 may extend throughout the length of a pixel matrix to transmit data and clock signals to data line driving circuitry 66 which drives the pixels 60 on data lines 50 which are farthest from the display controller 98 (i.e., the source of the data and clock signals). Due to RC effects and/or other transmission line effects of the bus 90, signals may eventually degrade as they propagate through a relatively long length of the bus 90. For example, in a 960×640 unit pixel matrix, the signals transmitted to driving circuitry 66 which drives the $960^{th}$ data line 50 may be degraded in comparison to an original signal or a signal driven to driving circuitry 66 which drives the first data line 50.

Figure 5:
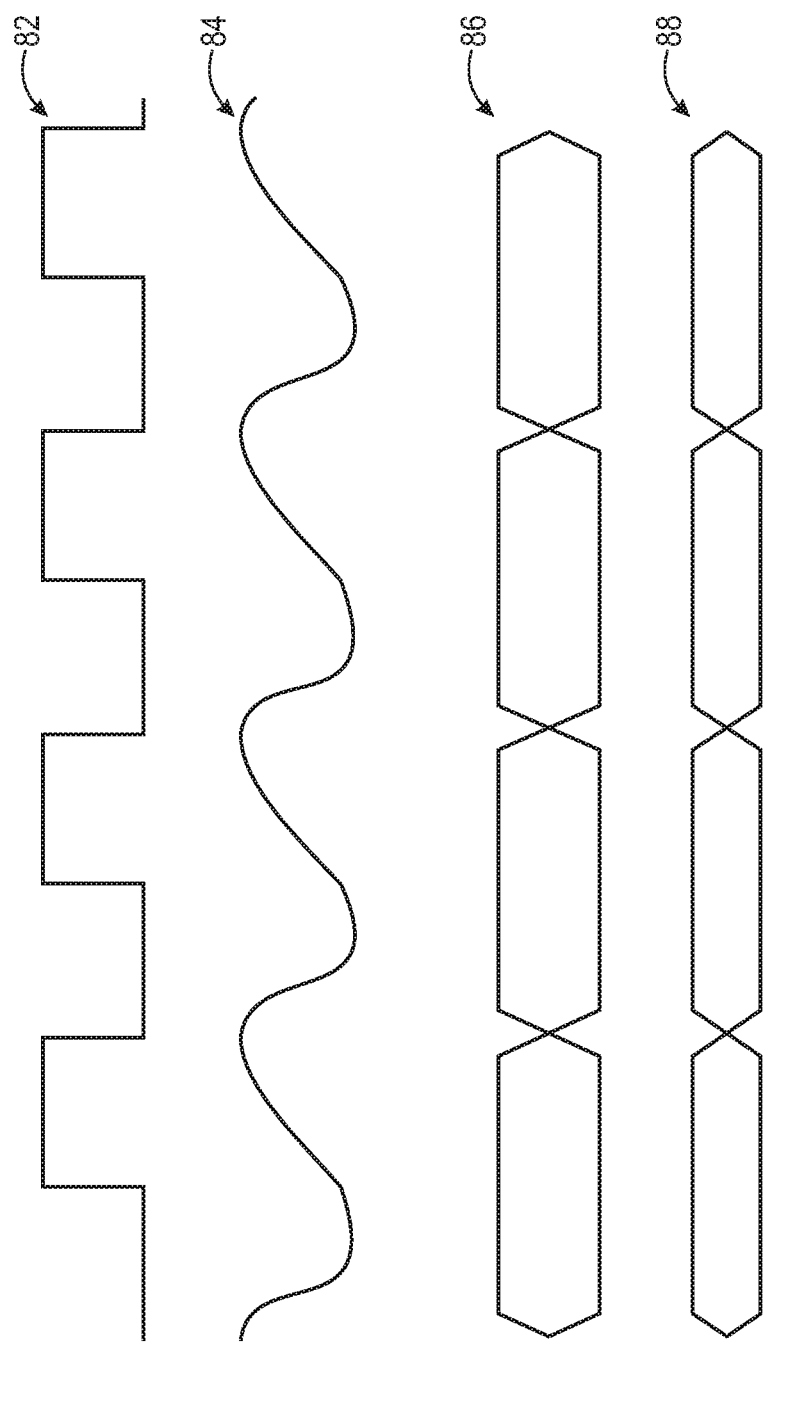
FIG. 5 illustrates an example of data and clock signals and relatively degraded data and clock signals, in accordance with aspects of the present disclosure.

FIG. 5 illustrates one example of signal degradation which may occur as signals are transmitted over a relatively long bus. An original clock signal 82 may generally have a waveform with steep edges, such as a square wave, where a rising edge or falling edge of the clock signal may automatically reach a logic high or a logic low threshold. However, clock signals transmitted through a bus may be impacted by the RC effect of the bus and become undesirably sloped, as depicted in the degraded clock signal 82. As data may be latched in response to a clock signal rising to some threshold logic level, degradations such as the sloped edges illustrated in the degraded clock signal 82 may lead to delays in data latching and/or failure to latch data.

Furthermore, data signals may also be affected by transmission line effects of a bus. Such RC effects, electromagnetic interferences and/or impedances of the bus 90 may degrade and possibly reduce the amplitude of an original data signal 86, as represented by the degraded data signal 88. Degraded data signals 88 received at the data line driving circuitry 66 may result in generating inaccurate and/or weakened image signals which are transmitted to the data lines 50 of the pixels 60.

In some embodiments, a synchronous bus may have one or more repeaters which may be selectively enabled or disabled depending on a destination of a signal transmitted through the bus. The repeaters may be positioned at intervals on the bus, and the intervals of the bus between each repeater may be referred to as segments. The repeaters may be selectively enabled according to where on the bus (e.g., which segment of the bus) a signal is to be transmitted. In one embodiment, a signal transmitted to the last segment of the bus may be sequentially restored by the repeater of each bus segment through which the signal propagates, until the signal reaches the last segment. As the length of each bus segment may be substantially shorter than the length of the entire synchronous bus, a signal may not degrade significantly as it propagates through a bus segment before the signal is restored by a repeater. For example, referring again to FIG. 5, the rising and falling edges of an original clock signal 82 and/or the amplitude of an original data signal 86 may be maintained, even for signals which propagate through the entire length of the bus.

Figure 6:
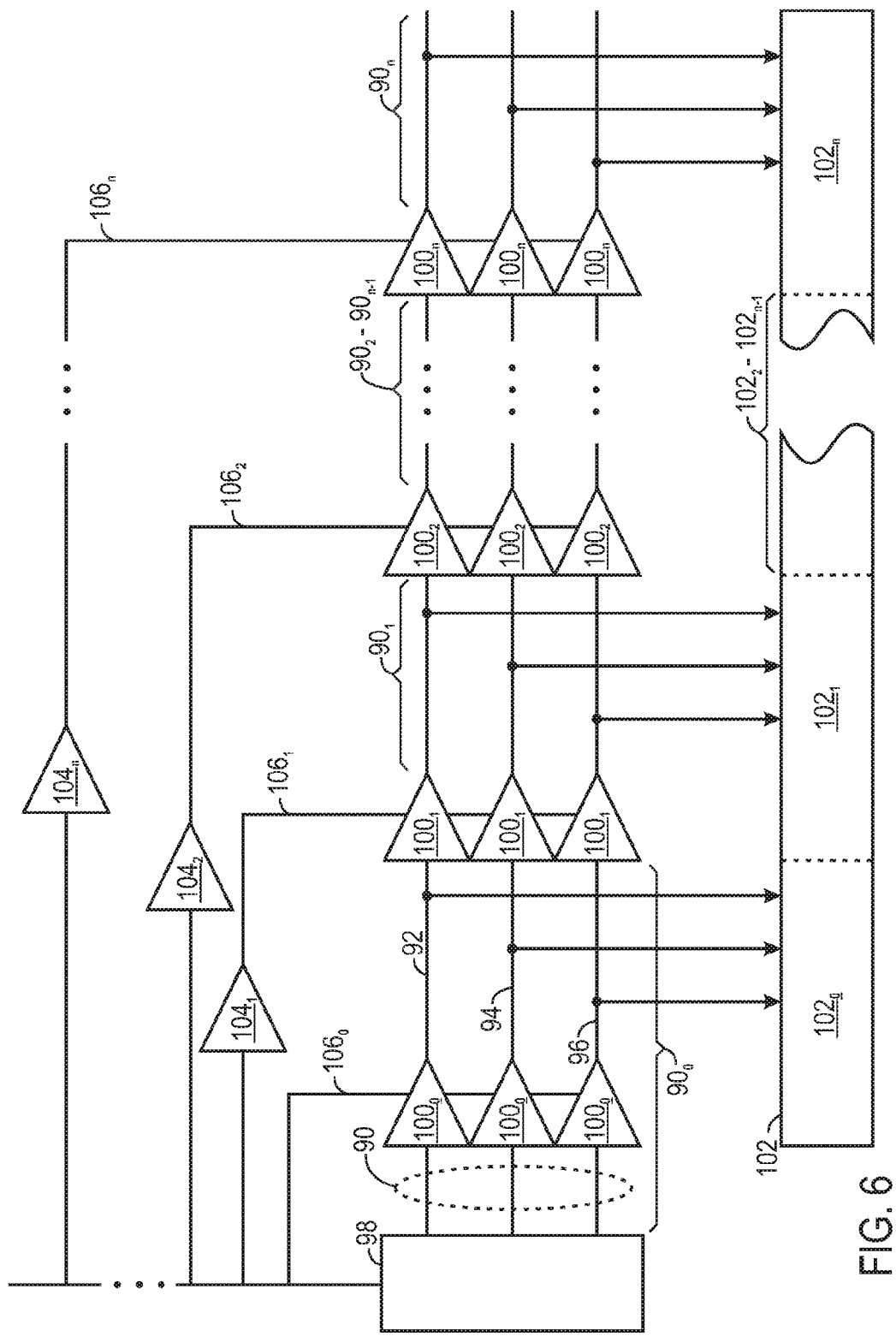
FIG. 6 is a schematic diagram showing a synchronous bus using repeaters for transmitting data and clock signals to data latching circuitry for use in the system of FIG. 4, in accordance with aspects of the present disclosure.

The schematic diagram illustrated in FIG. 6 provides one example of how repeaters may be implemented on a synchronous bus and selectively enabled or disabled based on where a signal is transmitted along the bus. The synchronous bus 90 may be used to transmit clock signals, data signals, and address signals, and may include a clock line 92, a data line 94, and an address line 96 to transmit such signals, respectively. The clock, data, and address signals may be generated by a controller 98, which may include a clock generator, a data transmitter, an address signal generator, etc. Data from the data signal may be latched according to a logic level of the clock signal. The address signal may include address information for directing the data and clock signals to a location (i.e., a destination) of a data latching circuitry 102 where the corresponding data signal and clock signal is to be transmitted for data latching. For example, referring to FIG. 4, one example of data latching circuitry 102 is the data line driving circuitry 66 in a display 12 (FIG. 1).

Repeaters 100 may be implemented on the synchronous bus 90 to restore signals transmitted through the bus 90. In some embodiments, a suitable repeater may include an inverter, an inverter chain, a differential amplifier, and/or any other element or circuitry suitable for restoring signals propagating through a synchronous bus 90. The repeaters 100 may be positioned along the bus 90, such that a signal propagating from a beginning portion of the bus 90 (e.g., closer to the controller 98 where the signal is generated) to an end portion of the bus 90 (e.g., farther from the controller 98) may be sequentially restored by the repeaters 100 along the bus 90 as the signal propagates to the end portion of the bus 90. Furthermore, while the clock, data, and address lines 92, 94, and 96 of the synchronous bus 90 are illustrated as having separate repeaters 100, it should be noted that in some embodiments, clock, data, and/or address signals may be restored by a single repeater 100 at each segment of the bus 90.

The implementation of repeaters 100 along the bus 90 may effectively create bus segments (e.g., segment $90_0$, $90_1$, $90_n$, etc.), which may each correspond to a section of the data latching circuitry 102 (e.g., section $102_0$, $102_1$, $102_n$, etc.). A bus 90 may have n number of repeaters 100 and a corresponding n number of bus segments which each transfer data and/or clock segments to one of n number of sections of data latching circuitry 102. In some embodiments, the sections of the data latching circuitry 102 may be in continuous or may have separate circuit components, and data latched by each section of the data latching circuitry 102 may be used by different elements or devices of an electronic system (e.g., different pixels 60 of a display 12 in a system 10, as previously discussed in FIGS. 1 and 4).

In some embodiments, the repeaters 100 may be sequentially enabled by the controller 98 based on where signals are addressed. For example, the controller 98 may generate data and clock signals addressed to a destined bus segment $90_2$ of the bus 90, such that the corresponding section $102_2$ of the data latching circuitry 102 may latch the data based on the clock signal. The data and clock signals may be restored by one or more repeaters 100 preceding the destined bus segment $90_2$. The first repeater $100_0$ on the bus 90 may be precede a first section $102_0$ of the data latching circuitry 102. In one embodiment, the first repeater $100_0$ may be continuously enabled and may not be connected to a switching transistor 104, as data signals may always propagate through at least the first segment $90_0$ of the bus 90. Alternatively, in some embodiments, the first repeater $100_0$ may be eliminated, as signals may not have degraded substantially over the first bus segment $90_0$.

The controller 98 may enable other repeaters 100 preceding the destined bus segment $90_2$ by switching a transistor (or transistor array) 104 of a respective repeater 100. The transistor 104 may be connected to both the controller 98 and a repeater 100 via a designated wire 106. For example, the controller 98 may enable the repeater $100_1$ corresponding to bus segment $90_1$ by switching the transistor $104_1$. The switching of the transistor $104_1$ may enable the repeater $100_1$ to restore the signal before it propagates through the bus segment $90_1$. Similarly, the controller 98 may enable the repeater $100_2$ corresponding to bus segment $90_2$ by switching the transistor $104_2$ to enable the repeater $100_2$.

Thus, a signal directed to the bus segment $90_2$ may be sequentially restored by the repeaters $100_0$, $100_1$, and $100_2$ before the signal reaches a destination address in the bus segment $90_2$. A signal degraded by transmission line effects of one segment $90_0$ may be restored by a subsequent repeater $100_1$ which outputs a restored signal. Similarly, subsequent repeaters 100 may restore the signal before the signal reaches the destined bus segment $90_2$. As signals may be restored by all repeaters $100_0$, $100_1$, and $100_2$ preceding the destined bus segment $90_2$, the data and clock signals received at the section $102_2$ of the data latching circuitry 102 may not be significantly degraded, and may be substantially similar to the original data and clock signals generated by the controller 98.

Further, in some embodiments, repeaters 100 positioned on a later bus segment (i.e., farther along the bus 90 with respect to the location of the controller 98) than the destined bus segment may remain disabled. For example, subsequent repeaters $100_3$ to $100_n$ of the destined bus segment $90_2$ may remain disabled. By enabling only the repeaters $100_0$ and $100_1$ preceding a destined bus segment $90_2$ and a repeater $100_2$ of a destined bus segment $90_2$, the electronic system 10 (FIG. 1) may limit power expenditure to enabling a repeater 100 and restoring a signal only as far along the bus 90 as the signal is addressed, thus possibly reducing overall power consumption in the system 10.

Figure 7:
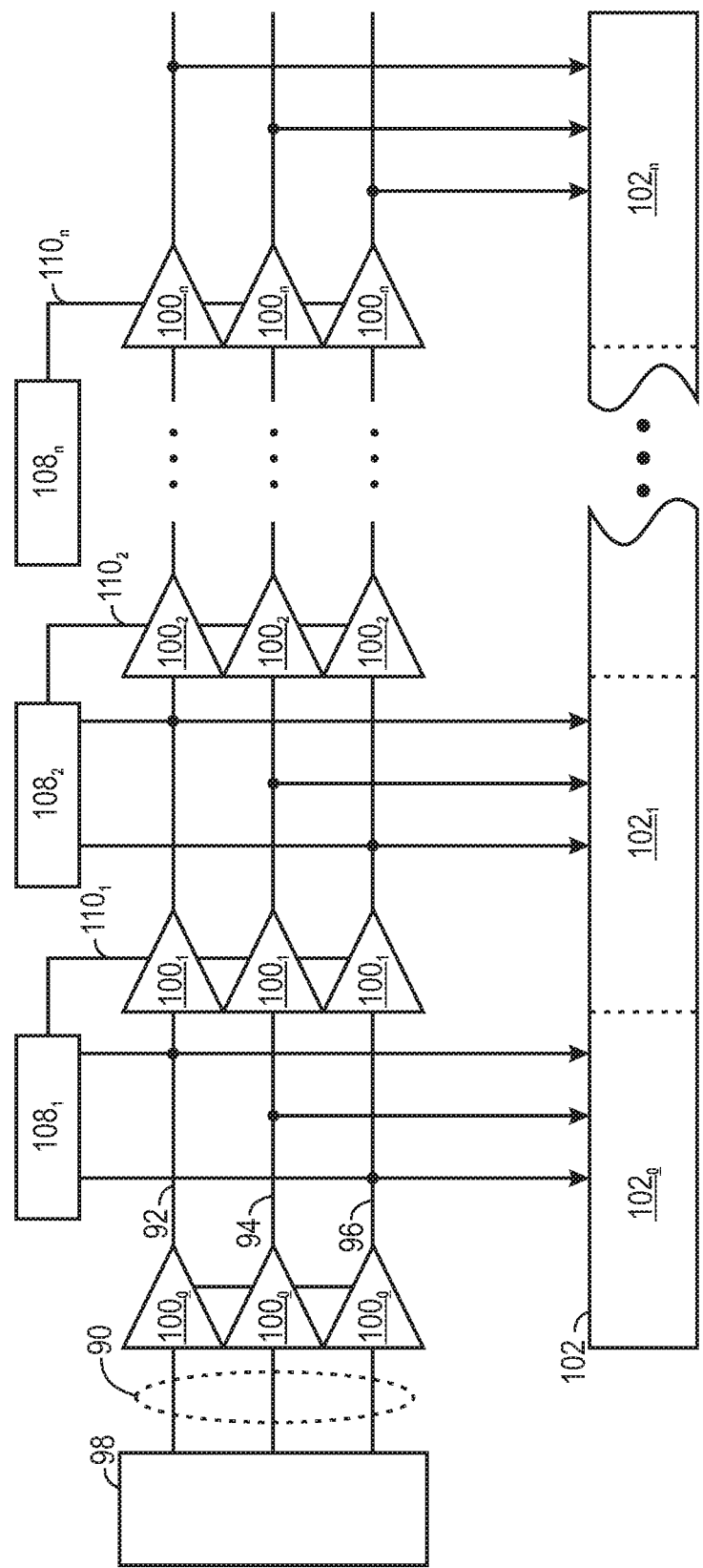
FIG. 7 is a schematic diagram showing a synchronous bus using repeaters and decoders for transmitting data and clock signals to data latching circuitry for use in the system of FIG. 4, in accordance with aspects of the present disclosure.

Another embodiment of selectively enabling repeaters along a synchronous bus 90 is provided in the schematic diagram of FIG. 7. Similar to an embodiment presented in FIG. 6, repeaters 100 may be implemented throughout a synchronous bus 90. Additionally, as illustrated in FIG. 7, a decoder 108 may be connected to a repeater 100 and to the address line 96 and clock line 92 at each segment of the bus 90. The transition between different signals transmitted by the controller 98 may be aligned based on the clock signal, which is received by the decoders 108 via the clock line 92.

The decoder 108 may be suitable for decoding a portion of the address signal transmitted through the address line 96 and enabling the respective repeaters 100 based on the decoded portion of the address signal. In one embodiment, the decoder 108 may decode the most significant bits (MSB) of the address signal, which may indicate a section of the data latching circuitry 102 and/or a segment of the bus 90 to which the signals is addressed. For example, if the bus 90 has 8 segments and the data latching circuitry 102 has 8 sections, the MSB may be the first three bits. When the MSB is 000, a decoder 108 may determine that the signal is addressed to the first segment $90_0$; when the MSB is 001, a decoder 108 may determine that the signal is addressed to the second segment $90_1$, and so forth.

By utilizing decoders 108 for selectively enabling a repeater 100, wiring dedicated to connecting the repeaters 100 and the controller 98 may be eliminated. For example, embodiments implementing decoders 108 may not use the transistor switches 104 and dedicated wires 106 as discussed in FIG. 6. More specifically, address, clock, and data signals may be transmitted through the bus 90, and based on the decoded portion of the address signal, a decoder 108 may either enable its respective repeater 100 or maintain the repeater 100 in a disabled state. As discussed, selectively enabling only the repeaters 100 preceding a destined segment of a bus 90 may reduce power consumption of the system.

In one embodiment, a controller 98 may generate data and clock signals addressed to a destined bus segment $90_2$ of the bus 90, such that the corresponding section $102_2$ of the data latching circuitry 102 may latch the data of the data signal based on the clock signal. The data and clock signals may be restored by one or more repeaters 100 preceding the destined bus segment $90_2$. The first repeater $100_0$ on the bus 90 may be precede a first section $102_0$ of the data latching circuitry 102. In one embodiment, the first repeater $100_0$ may be continuously enabled and may not have a corresponding decoder 108, as data signals may always propagate through at least the first segment $90_0$ of the bus 90. Alternatively, in some embodiments, the first repeater $100_0$ may be eliminated, as signals may not have degraded substantially over the first bus segment $90_0$.

Other repeaters 100 preceding the destined bus segment $90_2$ may be enabled by the respective decoder 108 connected to the repeater 100. For example, the decoder $108_1$ may decode the MSB of the address signal from the address line 96. The MSB may be 010, which corresponds to the destined bus segment $90_2$. As the decoded MSB indicates a destined bus segment $90_2$ which is farther along the bus 90 than the bus segment $90_1$ of the decoder $108_1$, the decoder $108_1$ may enable the repeater $100_1$ through line $110_1$, such that the signal may be restored by the repeater $100_1$ before the signal propagates through the bus segment $90_1$.

The decoder $108_2$ may receive the address signal from the address line 96 at the bus segment $90_1$, and may decode the MSB of the address signal from the address line 96. As the decoded MSB indicates that the destined bus segment $90_2$ is the bus segment $90_2$ corresponding to the repeater $100_2$ of the decoder $108_2$, the decoder $108_2$ may enable the repeater $100_2$, such that the repeater $100_2$ may restore the signal before it reaches some destined location in the bus segment $90_2$ or some destined location in the corresponding section $102_2$ of the data latching circuitry 102.

Thus, transmission line effects, such as RC effects, electromagnetic interferences, crosstalk, and/or induction may be reduced by using repeaters to restore a signal propagating through a bus 90 at certain intervals on the bus 90. In some embodiments, power consumption may be reduced by selectively enabling the repeaters and restoring a signal based on the destination address of the signal.

Additionally, in some embodiments, signal degradation may be further reduced and/or prevented by pre-emphasizing the signals transmitted through the bus 90. Pre-emphasizing a signal may refer to increasing the voltage of a signal during an initial portion of the signal period, such that the signal may reach a threshold level despite transmission line effects which may degrade the signal. As depicted in the signal diagrams of FIG. 8, an ideal and/or undegraded clock signal 110, represented by the solid line, may preferably have steep edges, such as a square wave, where a rising edge or falling edge of the clock signal may automatically reach a logic high threshold or a logic low threshold. The steep edges of the undegraded clock signal 110 may result in accurate data latching. However, as discussed, transmission line effects may cause signal degradation, as represented by the dotted degraded clock signal 112. As depicted, the degraded clock signal 112 may not reach a logic high threshold 118 until nearly the end of each signal period, at $t_2$, which may result in latching delays. Further, a degraded clock signal 112 may sometimes never reach a logic high threshold 118, which may cause data latching failures.

In some embodiments, a pre-emphasized clock signal 114, represented by the solid line, may have an initially increased voltage at the beginning of each signal period. By increasing the initial voltage, a degraded pre-emphasized clock signal 116, represented by the dotted line, may reach a logic high threshold 118 at $t_1$ (which may be earlier than $t_2$) more quickly within each signal period compared to the degraded clock signal 112 that was not originally pre-emphasized. Thus, by pre-emphasizing the signal, data latching errors may be reduced.

Pre-emphasized signals 114 may be used in conjunction with the present techniques of implementing repeaters 100 and selectively enabling repeaters 100 to restore signals transmitted through a synchronous bus 90. For example, the controller 98 may pre-emphasize the clock, data, and/or address signals transmitted through the bus 90. The pre-emphasized signal(s) may then be sequentially restored by each repeater 100 as the signal(s) propagate through the length of the bus 90. Furthermore, in some embodiments, one or more of the repeaters 100 may include circuitry suitable for pre-emphasizing the signals, such that the effects of signal degradation may be reduced within in each segment of the bus 90. For example, for a relatively long bus 90, certain repeaters 100 (e.g., every other repeater) may include circuitry suitable for pre-emphasizing a signal. In some embodiments, pre-emphasizing signals at the controller 98 and/or the repeaters 100 may enable a reduced number of repeaters (which may result in relatively longer bus segments) in the bus 90, which may simplify the design of the electronic system 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of transmitting signals over a synchronous bus of an electronic device, the method comprising:
    transmitting signals from a controller to circuitry of the electronic device over a synchronous bus, wherein the synchronous bus comprises multiple segments and a plurality of repeaters, wherein the repeaters are configured to restore the transmitted signals onto corresponding segments of the multiple segments, and wherein transmitting the signals comprises directing the signals to a destined segment of the multiple segments; and
    selectively enabling one or more of the plurality of repeaters that precede the destined segment on the synchronous bus with respect to a location of the controller, while disabling any of the plurality of repeaters that are beyond the destined segment, wherein each of the plurality of repeaters restores the transmitted signals when selectively enabled.

2. The method of claim 1, wherein selectively enabling the one or more of the plurality of repeaters comprises switching one or more transistors, wherein each of the one or more transistors is coupled to a respective one of the enabled repeaters.

3. The method of claim 1, wherein selectively enabling the one or more of the plurality of repeaters comprises:
    switching on a first transistor coupled to a respective one of the enabled repeaters; and
    switching off a second transistor coupled to a respective one of the disabled repeaters.

4. The method of claim 1, comprising using the controller to switch a transistor on or off, wherein the controller is coupled to each of the plurality of repeaters via a respective transistor.

5. The method of claim 1, comprising decoding a portion of the signals to identify the destined segment.

6. The method of claim 5, wherein decoding the portion of the signals comprises decoding the signal portion at each of the plurality of repeaters that precede the destined segment.

7. The method of claim 5, wherein selectively enabling one or more of the plurality of repeaters comprises:
using a decoder circuitry to enable any of the plurality of repeaters that precede the destined segment; and
using the decoder circuitry to disable any of the plurality of repeaters beyond the destined segment.

8. The method of claim 1, wherein transmitting the signals from the controller comprises pre-emphasizing the signals.

9. The method of claim 1, comprising pre-emphasizing the signals at each of the enabled repeaters.

10. A method, comprising:
driving a data signal through a synchronous bus from a controller to a destination on the synchronous bus;
enabling a preceding repeater on the synchronous bus, wherein the preceding repeater precedes the destination along the synchronous bus with respect to a location of the controller, and wherein the preceding repeater restores the data signal toward the destination and a subsequent repeater when enabled; and
disabling the subsequent repeater on the synchronous bus, wherein the subsequent repeater is past the destination.

11. The method of claim 10, wherein enabling the preceding repeater comprises switching on a first transistor gate on a first wire coupling the controller and the preceding repeater, and wherein disabling the subsequent repeater comprises switching off a second transistor gate on a second wire coupling the controller and the subsequent repeater.

12. The method of claim 10, comprising:
transmitting an enabling signal from the controller to switch on the preceding repeater; and
transmitting a disabling signal from the controller to switch off the subsequent repeater.

13. The method of claim 12, wherein the enabling signal is transmitted through a first wire connecting the controller, a first switch, and the preceding repeater, and wherein the disabling signal is transmitted through a second wire connecting the controller, a second switch, and the subsequent repeater.

14. The method of claim 10, comprising:
driving an address signal through the synchronous bus to the destination;
decoding a portion of the address signal to determine the destination; and
determining whether a current repeater is a preceding repeater or a subsequent repeater.

15. The method of claim 10, comprising:
driving an address signal through the synchronous bus to the destination; and
decoding a portion of the address signal at each preceding repeater to determine the destination.

16. The method of claim 10, comprising pre-emphasizing the data signal at the controller.

17. The method of claim 10, comprising pre-emphasizing the data signal at the preceding repeater.

18. An electronic system, comprising:
a synchronous bus;
a controller configured to drive a signal through the synchronous bus; and
a plurality of repeaters coupled to the synchronous bus and positioned at intervals throughout a length of the synchronous bus, wherein one or more of the plurality of repeaters is enabled if the signal is addressed to a destination on the synchronous bus beyond the repeater, wherein the repeaters are configured to restore the transmitted signals on further segments of the synchronous bus when enabled, and wherein any repeaters past the destination are disabled.

19. The electronic system of claim 18, comprising a plurality of transistors, each coupled to the controller and coupled to a respective one of the plurality of repeaters, wherein the controller is configured to enable a first repeater of the plurality of repeaters by switching on a first transistor of the plurality of transistors coupled to the first repeater.

20. The electronic system of claim 18, comprising a plurality of decoders, wherein each of the plurality of decoders is coupled to a respective one of the plurality of repeaters, and wherein each decoder is configured to decode a portion of the signal and enable the respective repeater based on the decoded portion of the signal.

21. The electronic system of claim 18, comprising a plurality of decoders, each configured to decode a portion of the signal to identify the destination of the signal, wherein each of the plurality of decoders is coupled to a respective one of the plurality of repeaters, and wherein a first decoder of the plurality of decoders is configured to enable a respective first repeater of the plurality of repeaters if the destination is beyond the first decoder, and wherein a second decoder of the plurality of decoders is configured to disable a respective second repeater of the plurality of repeaters if the destination precedes the second decoder.

22. The electronic system of claim 18, wherein the controller is configured to pre-emphasize the signal and drive the pre-emphasized signal through the synchronous bus.

23. The electronic system of claim 18, wherein the enabled repeater is configured to pre-emphasize the signal.

24. The electronic system of claim 18, wherein the electronic system is an electronic display system, and wherein the destination on the synchronous bus corresponds to a section of data line driving circuitry in the electronic display system.

* * * * *